United States Patent

[11] 3,569,784

| [72] | Inventors | Douglas G. Carroll;<br>Jack E. Menick, San Jose, Calif. |
|---|---|---|
| [21] | Appl. No. | 777,759 |
| [22] | Filed | Nov. 21, 1968 |
| [45] | Patented | Mar. 9, 1971 |
| [73] | Assignee | the United States of America as represented by the United States Atomic Energy Commission |

[54] SOLID STATE CROWBAR CIRCUIT
5 Claims, 2 Drawing Figs.

| [52] | U.S. Cl. | 317/16 |
|---|---|---|
| [51] | Int. Cl. | H02h 3/08 |
| [50] | Field of Search | 317/16; 307/107; 307/139 |

[56] References Cited
UNITED STATES PATENTS

| 3,192,441 | 6/1965 | Wright | 323/22 |
|---|---|---|---|
| 3,450,947 | 6/1969 | Rogers, Sr. | 317/33X |
| 3,246,206 | 4/1966 | Chowdhuri | 317/31 |
| 3,340,407 | 9/1967 | Sinclair | 307/101 |
| 3,359,434 | 12/1967 | Galluzzi | 307/88.5 |

Primary Examiner—William M. Shoop, Jr.
Assistant Examiner—Harry E. Moose, Jr.
Attorney—Roland A. Anderson ABSTRACT: A fast-acting electronic switch, known as an electronic crowbar circuit, used to divert large quantities of electrical current from an electronic device in the event of a current fault or arc until a contractor can remove the power thereto, to prevent damage to the device as a result of excessive current. This is accomplished by the utilization of a silicon controlled rectifier and associated circuitry which will sense an arc or excessive current and switch practically all of the fault energy from the device to the crowbar in a time on the order of 1 microsecond, there being no auxiliary power source required for operation of the circuit.

PATENTED MAR 9 1971          3,569,784

INVENTOR.
DOUGLAS G. CARROLL
JACK E. MENICK
BY
ATTORNEY

SOLID STATE CROWBAR CIRCUIT

BACKGROUND OF THE INVENTION

The invention described herein was made in the course of, or under Contract No. AT(04-3)-189, Project Agreement No. 15, with the U.S. Atomic Energy Commission.

This invention relates to protective apparatus for electrical equipment, and more particularly to a protective circuit for diverting large quantities of electrical current from a device in event of a current fault until the power thereto can be removed.

Various prior art devices have been developed to provide protection for electrical apparatus, as exemplified by U.S. Pat. No. 3,343,085 to Ovshinsky and U.S. Pat. No. 3,369,153 to Arnold et al. Circuits utilized for the protection of electrical or electronic apparatus are commonly known as crowbar circuits which function to bypass or short out the power to the apparatus being protected subject to an adverse current or voltage surge which would otherwise damage the apparatus.

Another of the more commonly known prior art protective circuits utilizes a mercury vapor thyratron tube which has the following disadvantages:
1. Control characteristics of the tube show aging.
2. A battery is required to bias the control grid of the tube. As the battery ages, frequent adjustment of the bias voltage is required and eventually the battery requires replacement. A weak battery causes erratic, unnecessary tripping of the apparatus.
3. Eventually the thyratron tube wears out and requires replacement.

SUMMARY OF THE INVENTION

The present invention is directed to a solid state crowbar circuit which incorporates a silicon controlled rectifier, and which will sense an arc and switch practically all of the fault energy from the apparatus being protected to the crowbar in a time on the order of 1 microsecond. In addition, the inventive device, while filling the requirements achieved by the known prior art devices, has the following advantages:
1. Does not age appreciably.
2. Has a life expectancy measured in years rather than months, as in the case with the mercury vapor thyratron tube.
3. Requires no triggering device which will age or wear out. Therefore, it is an object of this invention to provide a protective device for electrical and electronic apparatus.

A further object of the invention is to provide a crowbar circuit which incorporates a silicon controlled rectifier for use in diverting large quantities of electrical power from a device being protected.

Another object of the invention is to provide a solid state crowbar circuit which does not age appreciably, has a long life expectancy, and requires no triggering device subject to wear.

Other objects of the invention will become readily apparent from the following description and accompanying drawings wherein:

DESCRIPTION OF THE INVENTION

The inventive crowbar circuit is used to divert large quantities of electrical current from a device, such as a test apparatus, until a contactor or switch can remove the power thereto in the event of a current fault. This is done to prevent damage to the apparatus by an excessive fault current. Such a device requiring protection from excessive current is an electron bombardment heater which will be described hereafter for the purpose of illustrating the use of the invention. However, it is not intended to limit the inventive crowbar circuit to use with this exemplary apparatus as it can be utilized with various apparatus requiring similar protection.

Electron bombardment heaters are being used to simulate the heat flux generated by radioactive fuels in studies of corrosion and mass transfer in sodium systems. Occasionally, in the operation of these heaters, arcs will occur which develop sufficient energy density at the anode of the heater to prove detrimental to the life thereof, either by structural collapse or by puncturing the anode and admitting sodium. This danger can be removed by the fast acting electronic switch operation of the inventive electronic crowbar circuit. The solid state crowbar circuit of the present invention will sense an arc and switch practically all of the fault energy from the heater to the crowbar in a time on the order of 1 microsecond.

The switching element in the inventive crowbar circuit for an electron bombardment heater, for example, meets the specifications required for such a switching device, these being:
1. Switch reliably from its high impedance to low impedance state in less than 100 microseconds.
2. Hold its low impedance state under all loading conditions for at least 100 milliseconds.
3. Carry a maximum fault current of 216 amps for at least 100 milliseconds.
4. Withstand a maximum voltage of at least 1 kv. under normal operating conditions.

In addition, the switch element of the inventive crowbar circuit:
1. Does not age appreciably.
2. Has a life expectancy measured in years rather than months, as in the case of the mercury vapor thyratron tube.
3. Requires no triggering device which will age or wear out.

The switching device utilized in the present crowbar circuit is a silicon controlled rectifier (SCR). For example, the General Electric C150 PA or the General Electric C137 PB silicon controlled rectifiers can be used. However, the basic trigger circuit should work for any SCR.

Reliability, economy, and simplicity of design are the major consideration in crowbar circuits utilizing a SCR. The only precaution which need be observed is to limit the SCR gate current to prevent fusing of the gate junction. Observing this precaution and recognizing that the triggering gate voltage will always be positive, the SCR trigger circuit illustrated in FIG. 1, which is a simple resistance network, provides probably the simplest form of such a trigger circuit.

Figure 1:
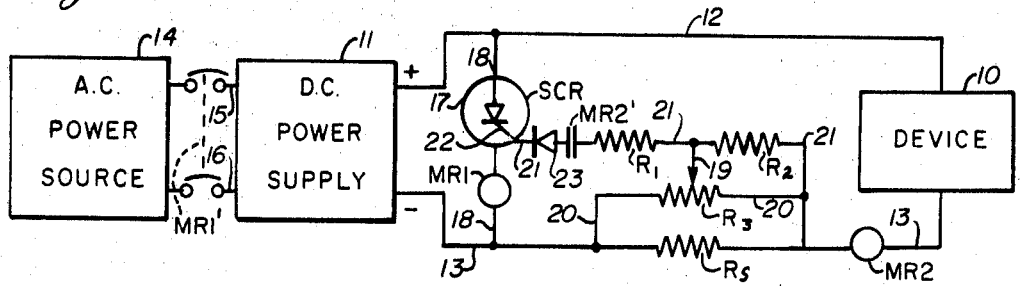
FIG. 1 is a schematic illustration of the inventive crowbar circuit.

Referring now to FIG. 1, the novel crowbar circuit is interconnected between a device 10 to be protected, such as an electron bombardment heater, and a DC power supply 11 which are electrically connected by leads or lines 12 and 13. An electrical power source 14 is connected to power supply 11 via leads 15 and 16. The power source 14, for example, may be of the 480 v., 60 Hz,. 3-phase AC type, while the power supply 11 is a 0—1000 v., 35 KW. DC type. Since DC power supplies are well known in the art, a detailed description thereof is deemed unnecessary, particularly since the details thereof do not constitute part of this invention.

The crowbar circuit comprises a silicon controlled rectifier (SCR) 17 connected via a line 18 to lines 12 and 13 so as to be in parallel with the device 10. A meter relay MRI is mounted in line 18 in series with the SCR 17 and adapted to actuate contactors MRI' in lines 15 and 16 for disconnecting power supply 11 from the source 14. A resistor $R_s$ is positioned in line 13 intermediate device 10 and the junction with line 18. A potentiometer composed of a resistor $R_3$ and a wiper 19 is mounted in parallel with resistor $R_s$ via line 20, wiper 19 being connected via a line 21 to line 20 and to a gate terminal 22 of SCR 17. The potentiometer ($R_3$) may be, for example, a 2.5 kohms, 10-turn type, with the resistor $R_s$ of a 0.5 ohm, 2 KW. type. Also positioned in line 13 intermediate device 10 and the junction with line 20 is another meter relay MR2 which actuates contacts MR2' located in line 21 between wiper 19 and gate terminal 22. Meter relay MR1 is of the normally closed, power opened type, with relay MR2 being of the normally open, power closed type, as known widely in the art. Also positioned in line 21 on each side of wiper 19 are current limiting resistors $R_1$ and $R_2$ which protect the gate 22 of the SCR 17 from being damaged by overcurrent. For example, $R_1$ may be a 10 ohms, 1 watt resistor, with resistor $R_2$ being of the 600 ohms, 1 watt type.

The operation of the novel crowbar circuit illustrated in FIG. 1 is quite simple. As known in the art, the SCR 17 fires (switches to its low impedance state) when some critical voltage is applied at its gate terminal 22. As shown, this critical voltage is always positive with respect to the cathode of the SCR so no bias battery is required. The resistor $R_s$ is the sensing device for the crowbar circuit. Almost all of the current which flows through the protected device 10 flows through resistor $R_s$. Thus a change in current through the device 10 will cause a corresponding change in voltage drop across resistor $R_s$. Resistor $R_3$ allows a portion of the voltage developed across resistor $R_s$ to be seen by the gate 22 of the SCR 17 through line 21 and current limiting resistors $R_1$ and $R_2$. When the gate voltage reaches a critical value as determined by the position of wiper 19 on resistor $R_3$, the SCR will change to its low impedance state in a time on the order of 1 $\mu$sec. In the low impedance state the voltage drop across the SCR 17 may be, for example, less than 3 volts independent of current greater than 0.5 amp. When the SCR begins to conduct, meter relay MRl will be activated in about 100 milliseconds, for example, to open the main contactors MRl' turning off all power to power supply 11. Meter relay MR2 is included to protect against a characteristic of the power supply 11 which exhibits a sizable voltage spike on automatic reset which causes the SCR 17 to fire on reset. The relay MR2 with its contacts MR2' placed in the gate circuit (line 21) hold the SCR out of the system until the relay coil of the MR2 senses a small current, for example, 3—5 amps, in the device 10, at which time the relay closes the contacts MR2' and the crowbar circuit functions as described above.

When the novel crowbar circuit is used with a device 10 which requires AC power, a diode 23 is connected in line 21 intermediate meter relay contacts MR2' and the SCR gate terminal 22. Under such AC operation, the DC power supply 11 would be replaced by an appropriate AC power supply, as known in the art.

Figure 2:
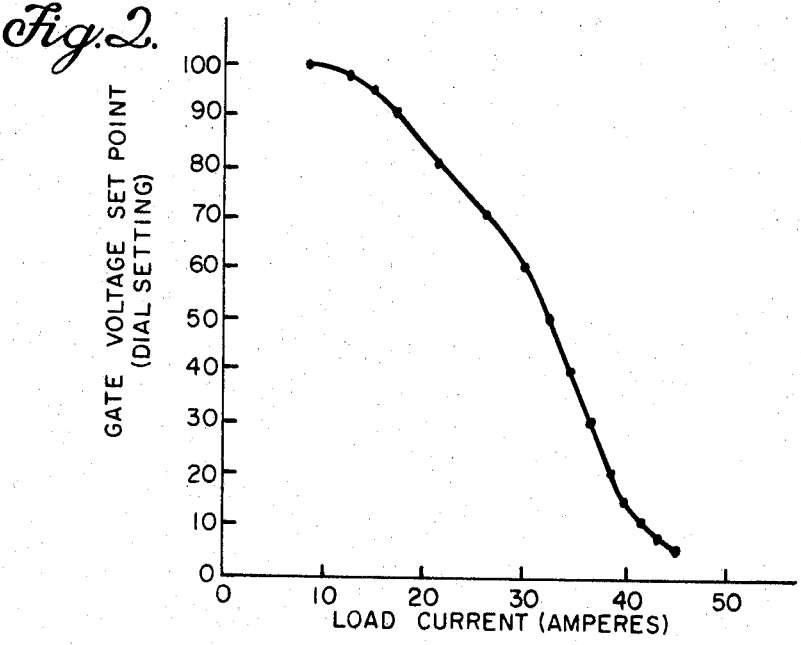
FIG. 2 is graph plotting the gate voltage versus load current.

Using a 10 KW. variable resistor as the device 10 (dummy load), crowbar characteristics were determined for a load of 20 amps over a voltage range of 100 to 500 volts. The characteristics were found to be virtually voltage independent over this range and are assumed to remain so over the entire operating range of the power supply 11. Next, firing characteristics were measured and tabulated over the range of expected operating load currents (10 to 45 amps). FIG. 2 is a plot of these characteristics. Thus, FIG. 2 is the guide to crowbar setting for a circuit utilizing the example parameters set forth above. If, for example, it is desired to operate the device 10 at 40 amps and it is desired to protect against a rise in current greater than 10 percent of the load current, 44 amps, (40 plus 10 percent of 40) is found on FIG. 2. The intersection of the control curve with the 44-amp load current line corresponds with the gate voltage setpoint on the potentiometer ($R_3$) which should be chosen, in this case 0.65.

To gain crowbar protection at load currents higher than those considered here the control curve of FIG. 2 may be shifted to the right by simply increasing the value of resistor $R_2$.

The control curve of FIG. 2 was obtained with the SCR 17 at ambient temperature of about 65° F. The temperature was increased to about 115° F. by blowing hot air across the SCR. It was found that, with a gate voltage setpoint of 6.0, the SCR fired at 30 amps with ambient temperature 65° F. and at 29 amps with ambient temperatures at 115° F., this being due to the fact that an SCR is temperature sensitive. While in most applications, this shift is not of concern as the arcs in the device 10 cause a large current rise (much greater than 1 amp). If it is desired to eliminate this shift, a temperature control arrangement may be provided, such as placing the SCR Sin a constant temperature mechanism, for example, an oven. Some improvement may also be accomplished by mounting the SCR very close to the power shunt resistor $R_s$, the heat generated thereby equalizing small ambient temperature changes.

It is well to note that, assuming that temperature is fairly constant, the operation of the crowbar depends only upon the current drawn by the device 10. There is no dependence on the supply voltage other than the maximum limit of the SCR, for example, 1,100 volts.

In addition the novel crowbar circuit described above has been submitted to high voltage arc tests. The solder gap arc simulation was used to test the crowbar's ability to quench arcs. Power was applied to the dummy load and arcs initiated by touching a ballpoint pen to the solder gap. Practically no flash occurred and no visible damage was done either to the pen or the solder gap.

It has thus been shown that the present invention provides a novel crowbar circuit for protecting electrical or electronic apparatus which does not age appreciably, has a long life expectancy, and requires no active triggering device or external power source.

While a specific embodiment of the invention has been illustrated and described, modifications will be apparent to those skilled in the art, and it is intended to cover in the appended claims all such modifications as come within the true spirit and scope of the invention.

We claim:

1. A crowbar circuit operatively connected between a power supply and a device to be protected comprising: a silicon-controlled rectifier means adapted to be connected in parallel with an associated device to be protected, a first relay means connected in series with said rectifier means for actuating normally closed contactor means adapted for opening same and cutting off power to an associated device to be protected upon firing of said rectifier means, resistor means adapted to be connected in series with an associated device to be protected and intermediate such an associated device and said relay means, said resistor means being adapted to sense current flowing through such an associated device to be protected, variable potentiometer means connected in parallel with said resistor means, said potentiometer means being composed of at least a resistor and a movable wiper, said movable wiper being connected to a gate terminal of said rectifier means and adapted to allow a portion of a voltage developed across said resistor means to be passed to said gate terminal of said rectifier means, a second relay means connected in series with said resistor means and intermediate said resistor means and an associated device to be protected, said second relay means actuating normally open contact means connecter intermediate said gate terminal and said movable wiper and adapted to hold said rectifier means out of the system until said second relay means senses a small current from such an associated device for preventing said rectifier means from firing upon initial activation of the circuit, whereby said second relay means closes said normally open contact means upon sensing a small current from an associated device and said rectifier means switches to its low impedance state when a critical voltage is applied at said gate terminal thereby activating said relay means which in turn actuate said contactor means.

2. The circuit defined in claim 1, additionally including current limiting resistor means operatively connected to said variable potentiometer means to protect said gate from being damaged by overcurrent.

3. The circuit defined in claim 2, wherein said current limiting resistor means comprises a pair of resistor, said movable wiper being connected intermediate said pair of resistors.

4. The circuit defined in claim 1, additionally including diode means intermediate said gate terminal and said movable wiper.

5. The circuit defined in claim 2, additionally including diode means positioned intermediate said gate terminal and said movable wiper.